(12) United States Patent
Britsch et al.

(10) Patent No.: US 6,465,600 B1
(45) Date of Patent: Oct. 15, 2002

(54) METHOD FOR REMOVING INITIATORS FROM GRAFTING PRODUCTS

(75) Inventors: Lothar Britsch, Reute (DE); Egbert Müller, Darmstadt (DE); Josef-Stefan Stöhr, Nauheim (DE)

(73) Assignee: Merck Patent Geselleschaft mit beschranhkter Haftung (DE)

( * ) Notice: Subject to any disclaimer, the term of this patent is extended or adjusted under 35 U.S.C. 154(b) by 0 days.

(21) Appl. No.: 09/762,197

(22) PCT Filed: Aug. 4, 1999

(86) PCT No.: PCT/EP99/05634

§ 371 (c)(1),
(2), (4) Date: Feb. 5, 2001

(87) PCT Pub. No.: WO00/09574

PCT Pub. Date: Feb. 24, 2000

(30) Foreign Application Priority Data

Aug. 14, 1998 (DE) .......................... 198 37 020

(51) Int. Cl.$^7$ ................................. C08G 64/00
(52) U.S. Cl. ....................... 528/198; 528/196
(58) Field of Search ................. 528/196, 198

(56) References Cited

U.S. PATENT DOCUMENTS 4,279,791 A * 7/1981 Speakman .................. 528/482
5,095,090 A * 3/1992 Ono et al.

FOREIGN PATENT DOCUMENTS

EP          0 565 978 B1    10/1993
EP          0565978       * 10/1993

* cited by examiner

Primary Examiner—Terressa M. Boykin
(74) Attorney, Agent, or Firm—Millen, White, Zelano & Branigan, P.C.

(57) ABSTRACT

The present invention relates to a process for removing an initiator of cerium (IV) salt from a graft product. The process may include washing the graft product with a mineral acid solution comprising ascorbic acid.

18 Claims, No Drawings

METHOD FOR REMOVING INITIATORS FROM GRAFTING PRODUCTS

The invention relates to an improved procedure for the removal of initiators from graft products, in which the grafting was initiated by means of cerium(IV) salts.

The grafting of unsaturated compounds onto basic supports containing hydroxyl groups, as is disclosed in DE 38 11 042 and DE 43 10 964 and the publications EP 0 337 144 and EP 0 565 978 corresponding to these, is based on the procedure of Mino and Kaizermann (1958). Here, the grafting is initiated by cerium(IV) salts.

Washing of the graft product with 0.5 M sulfuric acid, as well as washing with acidic sodium sulfite solution (0.25 M solution of sodium sulfite in 0.25 M sulfuric acid), is known for the removal of cerium salts from the graft product. This process, however, in many cases has to be repeated a number of times in order to remove the cerium salts adequately from the product. It is seen that for cation exchangers, e.g. graft polymers based on acrylamidomethylpropanesulfonic acid, this procedure is inadequate. Working with acidic sulfite solution is disadvantageous for reasons of safety in the workplace. For other graft polymers which, for example, contain epoxy groups, repeated washing with the strong mineral acid is disadvantageous because a marked proportion of the epoxy groups are hydrolyzed here, or because the sulfite ions react with the epoxy groups. On account of this, in some graft products, in particular those which contain epoxy groups, a measurable residue (typically about 200 ppm of cerium) of cerium salts still remains in the product. In particular, if the separating materials prepared by means of grafting are used in biotechnology or for the preparation of pharmaceutical products, removal of cerium salts to below the detection limit of atomic absorption spectroscopy (10 ppm) is an essential property.

The object is thus to remove cerium salts from graft products which have been obtained by means of cerium(IV) initiation so that fewer than 100 ppm of cerium remain in the product.

It has been found that cerium salts can be removed more completely from the graft products if a mineral acid solution of ascorbic acid is used for washing.

The invention relates to procedures for the removal of initiators from graft products, in which the grafting was initiated by means of cerium(IV) salts, by washing with a mineral acid solution, ascorbic acid being added to this solution.

Apart from in the publications already mentioned, separating materials based on graft polymers in which the grafting is initiated using cerium(IV) salts are disclosed in a number of further publications: EP 0 697 905, EP 0 708 919, EP 0 721 372, EP 0 722 360, EP 0 722 361, EP 0 722 362, EP 0 789 620 and PCT/EP 98/01 880.

According to the invention, the separating materials from which cerium ions are to be washed out are treated with a mineral acid solution of ascorbic acid; preferentially the concentration of ascorbic acid is 0.01 to 2 mol/l, particularly preferably 0.1 to 0.5 mol/l, that of the mineral acid 0.01 to 2 mol/l, particularly preferably 0.1 to 0.5 mol/l. Preferred mineral acids are perchloric acid and in particular sulfuric acid. The washing process is typically carried out at 4° C. to 80° C., preferentially at 15° C. to 30° C., according to customary procedures, for example using a suction filter or by sedimentation and decantation. Washing is typically carried out with 3 to 10, usually 4 to 5, bed volumes of the solution.

The concentrations of the cerium salts are determined by means of optical emission spectrometry using a commercially available ICP spectrometer. The proportion by weight of cerium is measured on the basis of the calibration using cerium salts and customarily indicated in ppm (parts per million) as the percentage by weight of cerium based on the weight of the dried separating material. The separating material is dried for the analysis according to customary procedures, such that it has a water content determined according to Karl-Fischer of less than 0.1 percent by weight. Details of the cerium determination are found in Example 1. Using the process according to the invention, separating materials are obtained which contain between 1 and 10 ppm, customarily below 1 ppm, of cerium.

Even without further details, it is to be assumed that a person skilled in the art can utilize the above description to the widest possible extent. The preferred embodiments and examples are therefore only to be interpreted as descriptive, but in no way as limiting disclosure in any manner.

The complete disclosure of all applications, patents and publications mentioned above and below, in particular that of the corresponding application DE 198 37 020.2, filed on Aug. 14, 1998, are inserted into this application by way of reference.

EXAMPLES

Example 1

100 ml of a graft polymer based on Fractogel®, (Merck KGaA, Darmstadt, DE) containing 2-acrylamido-2-methylpropanesulfonic acid as monomer units, prepared according to EP 0 337 144, are washed on a suction filter with four bed volumes of a solution of 0.2 M ascorbic acid in 0.25 M sulfuric acid.

An aliquot (about 5–10 g) of the separating material is dried until the water content according to Karl-Fischer is less than 0.1% by weight. The weight of the dried separating material is then determined. The separating material is transferred to a 100 ml beaker and heated with 20 ml of a mixture (1:1) of $HNO_3$ (65% by weight; item no. 441, Merck KGaA, DE) and $H_2SO_4$ (96% by weight; item no. 714, Merck KGaA, DE). $H_2O_2$ (30% by weight; p.a.; item no. 7209, Merck KGaA, DE) is added dropwise in the presence of heat until the suspension is decolorized. After cooling to room temperature (15–30° C.), the suspension is made up to 25 ml with water. For the calibration solution, 0.5 ml of a cerium standard solution (1 g/l; item no. 2612; Merck KGaA, DE) is treated with 20 ml of the above mixture of $HNO_3$ and $H_2SO_4$ as described for the solution to be measured and made up to 25 ml. A mixture consisting of 20 ml of $NHO_3$ and $H_2SO_4$, which is made up to 25 ml with water, is used as the blank value.

The ICP measurement is carried out in the following way:

Apparatus: Perkin-Elmer Optima 3000 DV;
Atomizer: Cross Flow;
Sample introduction: 1 ml/min;
Plasma power: 1500 Watt;
Plasma gas: 15 l/min;
Auxiliary gas: 0.5 l/min;
Atomizer gas: 0.75 l/min;
Observation mode: axial;
Emission line: 413.755 nm.

The concentration measured for the solution to be measured is converted to the weight ratio ppm with the aid of the initial weight of the sample. The detection limit of the method is 10 ppm of cerium.

The content of cerium salts measured by means of atomic absorption spectrometry is below the detection limit (10 ppm of cerium).

Example 2

100 ml of graft polymer containing epoxy groups and based on Fractogel®, prepared according to EP 0 565 978, are washed on a suction filter using four bed volumes of a solution of 0.25 M ascorbic acid in 0.25 M sulfuric acid.

The content of cerium salts measured by means of atomic absorption spectrometry is below the detection limit (10 ppm).

Comparison Example 100 ml of graft polymer containing epoxy groups and based on Fractogel®, prepared according to EP 0 565 978, are washed on a suction filter with ten bed volumes of 0.5 M sulfuric acid.

The content of cerium salts measured by means of atomic absorption spectrometry is 237 ppm.

What is claimed is:

1. A process for the removing an initiator of cerium (IV) salt from a graft product, comprising washing the graft product with a mineral acid solution comprising ascorbic acid.

2. A process according to claim 1, wherein the concentration of the ascorbic acid in the solution is 0.01–2 mol/l.

3. A process according to claim 1, wherein the concentration of the ascorbic acid in the solution is 0.1–0.5 mol/l.

4. A process according to claim 1, wherein the concentration of the mineral acid in the mineral acid solution is 0.01–2 mol/l.

5. A process according to claim 1, wherein the concentration of the mineral acid in the mineral acid solution is 0.1–0.5 mol/l.

6. A process according to claim 2, wherein the concentration of the mineral acid in the mineral acid solution is 0.01–2 mol/l.

7. A process according to claim 2, wherein the concentration of the mineral acid in the mineral acid solution is 0.1–0.5 mol/l.

8. A process according to claim 3, wherein the concentration of the mineral acid in the mineral acid solution is 0.01–2 mol/l.

9. A process according to claim 3, wherein the concentration of the mineral acid in the mineral acid solution is 0.1–0.5 mol/l.

10. A process according to claim 1, wherein said mineral acid solution comprises perchloric acid as a mineral acid.

11. A process according to claim 1, wherein said mineral acid solution comprises sulfuric acid as a mineral acid.

12. A process according to claim 1, wherein the washing is carried out at 4° C.–80° C.

13. A process according to claim 1, wherein the washing is carried out at 15° C.–30° C.

14. A process according to claim 1, wherein the washing is carried out with 3 to 10 bed volumes of solution.

15. A process according to claim 1, wherein the washing is carried out with 4 to 5 bed volumes of solution.

16. A process according to claim 1, wherein the graft product after washing has less than 1 ppm of cerium.

17. A process according to claim 1, wherein the graft product after washing has less than 10 ppm of cerium.

18. A process according to claim 1, wherein the graft product to be washed is obtained by grafting unsaturated compounds onto basic supports wherein grafting is initiated by cerium (IV) salt.

* * * * *